(12) United States Patent
Sengiku et al.

(10) Patent No.: US 10,630,135 B2
(45) Date of Patent: Apr. 21, 2020

(54) ELECTRIC POWER TOOL

(71) Applicant: MAKITA CORPORATION, Anjo-shi, Aichi (JP)

(72) Inventors: Hitoshi Sengiku, Anjo (JP); Hideyuki Goto, Anjo (JP); Takayuki Yamagishi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 15/963,564

(22) Filed: Apr. 26, 2018

(65) Prior Publication Data

US 2018/0337575 A1 Nov. 22, 2018

(30) Foreign Application Priority Data

May 18, 2017 (JP) .................................. 2017-099247

(51) Int. Cl.
| | | |
|---|---|---|
| *H01R 13/627* | (2006.01) | |
| *H02K 5/22* | (2006.01) | |
| *H02K 29/08* | (2006.01) | |
| *H02K 11/28* | (2016.01) | |
| *H01R 4/34* | (2006.01) | |

(Continued)

(52) U.S. Cl.
CPC .............. *H02K 5/225* (2013.01); *H01R 4/34* (2013.01); *H01R 13/504* (2013.01); *H01R 13/5025* (2013.01); *H01R 13/516* (2013.01); *H01R 13/701* (2013.01); *H02K 7/145* (2013.01); *H02K 11/28* (2016.01); *H02K 29/08* (2013.01); *B24B 23/028* (2013.01); *B24B 47/12* (2013.01); *H01R 13/2442* (2013.01); *H01R 13/5219* (2013.01); *H01R 13/621* (2013.01); *H01R 2107/00* (2013.01); *H01R 2201/10* (2013.01); *H02K 1/2733* (2013.01)

(58) Field of Classification Search
CPC ........ H02K 5/225; H02K 29/08; H02K 7/145; H02K 1/2733; H02K 11/28; H01R 13/2442; H01R 13/5025; H01R 13/11; H01R 13/5219; H01R 13/621; H01R 2201/10; H01R 4/34; H01R 13/516; H01R 13/701; B24B 47/12; B24B 23/028; H02J 7/0045; B62D 5/0406
USPC ........................................................ 439/362
See application file for complete search history.

(56) References Cited

U.S. PATENT DOCUMENTS

| | | | | |
|---|---|---|---|---|
| 2013/0244504 A1* | 9/2013 | Ogura | ..................... | H01R 13/11 439/759 |
| 2014/0091683 A1* | 4/2014 | Ito | ......................... | B62D 5/0406 310/68 R |
| 2016/0241065 A1* | 8/2016 | Kondo | .................... | H02J 7/0045 |

FOREIGN PATENT DOCUMENTS

JP       2015-174214 A      10/2015

* cited by examiner

*Primary Examiner* — Jean F Duverne
(74) *Attorney, Agent, or Firm* — Oliff PLC (57) ABSTRACT

An electric power tool includes a terminal unit and a component. A signal line and a power line are coupled to the terminal unit. The signal line transmits signal. The power line supplies electric power. The terminal unit is mounted to the component. The terminal unit includes a signal terminal coupled to the signal line, and a power supply terminal coupled to the power line. The component includes a component-side signal terminal and a component-side power supply terminal. The component-side signal terminal is electrically conductive to the signal terminal of the mounted terminal unit. The component-side power supply terminal is electrically conductive to the power supply terminal of the mounted terminal unit.

12 Claims, 9 Drawing Sheets

(51) Int. Cl.
 *H01R 13/502* (2006.01)
 *H01R 13/504* (2006.01)
 *H01R 13/516* (2006.01)
 *H01R 13/70* (2006.01)
 *H02K 7/14* (2006.01)
 *H01R 13/52* (2006.01)
 *H02K 1/27* (2006.01)
 *B24B 23/02* (2006.01)
 *B24B 47/12* (2006.01)
 *H01R 13/24* (2006.01)
 *H01R 13/621* (2006.01)
 *H01R 107/00* (2006.01)

ELECTRIC POWER TOOL

BACKGROUND

This application claims the benefit of Japanese Patent Application Number 2017-099247 filed on May 18, 2017, the entirety of which is incorporated by reference.

TECHNICAL FIELD

The disclosure relates to an electric power tool such as a grinder.

RELATED ART

As disclosed in Japanese Patent Application Publication No. 2015-174214, there has been known a rechargeable grinder that includes a brushless motor 6.

The brushless motor 6 includes a rear insulator 15 to which a sensor circuit board 17 mounting a rotation detecting element is installed, and the rotation detecting element has a signal line 21 extracted from an upper portion of the sensor circuit board 17.

A short-circuit member 18 is installed to the rear insulator 15 to short-circuit each of three pairs of (six) coils 16 by three arc-shaped sheet metal members 22 via six fusing terminals 19. Respective power lines 24 of a U-phase, a V-phase, and a W-phase are welded to the sheet metal members 22.

The signal line 21 and each of the power lines 24 are directly attached to a controller 74.

In the above-described rechargeable grinder, the signal line 21 is directly attached to the sensor circuit board 17, and the power line 24 is welded to the sheet metal member 22. These couplings require some skills, and the couplings individually performed on the signal line 21 and the power line 24 relatively require labor.

Since the once coupled signal line 21 and power line 24 have difficulty in separation, when one of the sensor circuit board 17 and the controller 74, or one of the brushless motor 6 and the controller 74 needs to be replaced due to a trouble or similar reason, it is required to take any action, either separating the units one another with some labor or replacing both units even if the other does not need to be replaced.

Therefore, it is a main object of the disclosure to provide an electric power tool that includes an electrical coupling portion configured to be coupled with less labor.

It is another main object of the disclosure to provide an electric power tool in which some electric components electrically coupled to one another are configured to be easily replaced.

SUMMARY

In order to achieve the above-described object, there is provided an electric power tool according to a first aspect of the disclosure. The electric power tool includes a terminal unit and a component. A signal line and a power line are coupled to the terminal unit. The signal line transmits signal. The power line supplies electric power. The terminal unit is mounted to the component. The terminal unit includes a signal terminal coupled to the signal line, and a power supply terminal coupled to the power line. The component includes a component-side signal terminal and a component-side power supply terminal. The component-side signal terminal is electrically conductive to the signal terminal of the mounted terminal unit. The component-side power supply terminal is electrically conductive to the power supply terminal of the mounted terminal unit.

In a second aspect of the disclosure, which is in the above-described disclosure, the terminal unit may include a ring portion that surrounds at least one of the signal terminal and the power supply terminal.

In a third aspect of the disclosure, which is in the above-described disclosure, at least one of a combination of the signal terminal and the component-side signal terminal and a combination of the power supply terminal and the component-side power supply terminal may be configured to become electrically conductive by mutual contact, and at least one of the mutually contacting terminal may have an elasticity to be pressed to the contacted terminal.

In a fourth aspect of the disclosure, which is in the above-described disclosure, the terminal unit may include a terminal base that holds at least a part of the signal terminal and the power supply terminal, and a cover may be disposed on an outer side of the terminal base, the cover may be more flexible than the terminal base.

In a fifth aspect of the disclosure, which is in the above-described disclosure, one of the terminal unit and the component may include a projecting body, and the other may include a guide that guides the projecting body.

In a sixth aspect of the disclosure, which is in the above-described disclosure, the terminal unit may be mounted to the component with a screw.

In a seventh aspect of the disclosure, which is in the above-described disclosure, the component may be at least any of a switch box, a motor, and a controller of the motor.

In order to achieve the above-described object, in an eighth aspect of the disclosure, the electric power tool includes a terminal unit and a component. A signal line and a power line are coupled to the terminal unit. The signal line transmits signal. The power line supplies electric power. The terminal unit is mounted to the component. The terminal unit includes a signal terminal coupled to the signal line and a power supply terminal coupled to the power line. The component includes a component-side signal terminal and a component-side power supply terminal. The component-side signal terminal is electrically conductive to the signal terminal of the mounted terminal unit, and the component-side power supply terminal is electrically conductive to the power supply terminal of the mounted terminal unit. At least one of the terminal unit and the component includes a seal portion that seals at least one of a combination of the signal terminal and the component-side signal terminal and a combination of the power supply terminal and the component-side power supply terminal by mounting the terminal unit to the component. The signal terminal and the component-side signal terminal are mutually electrically conductive. The power supply terminal and the component-side power supply terminal are mutually electrically conductive.

In a ninth aspect of the disclosure, which is in the above-described disclosure, the terminal unit may be mounted to the component with a screw.

In a tenth aspect of the disclosure, which is in the above-described disclosure, the component may be at least any of a switch box, a motor, and a controller of the motor.

A main effect of the disclosure is to obtain an electric power tool that includes an electrical coupling portion configured to be coupled with less labor.

Another main effect of the disclosure is to obtain an electric power tool in which some electric components electrically coupled to one another are configured to be easily replaced.

BRIEF DESCRIPTION OF THE DRAWINGS

FIG. 7A is a bottom view, FIG. 7B is a right side view, FIG. 7C is a cross-sectional view taken along the line B-B in FIG. 7B.

DETAILED DESCRIPTION

The following describes embodiments of this disclosure based on the drawings as necessary.

Figure 1:
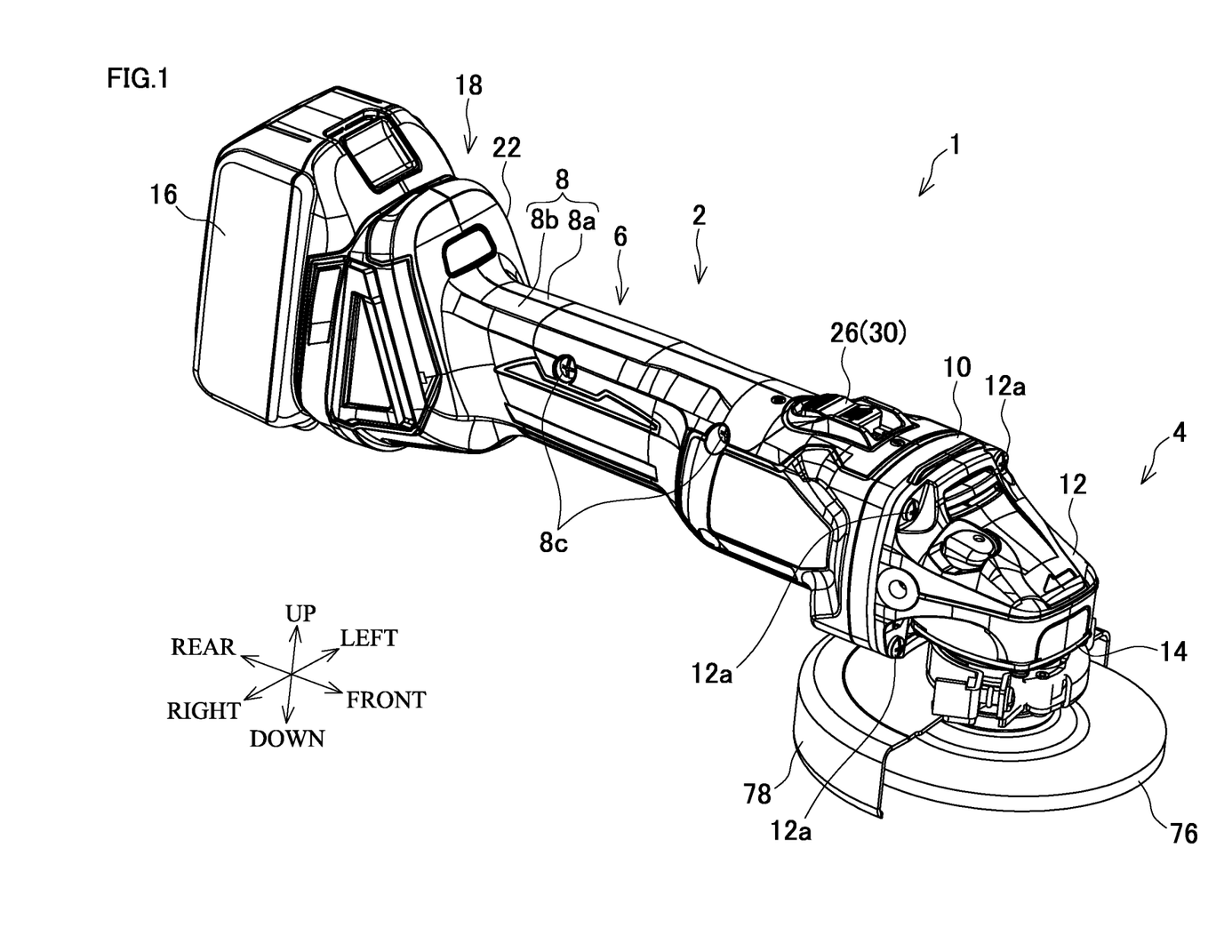
FIG. 1 is a perspective view of a grinder according to the disclosure.
Figure 2:
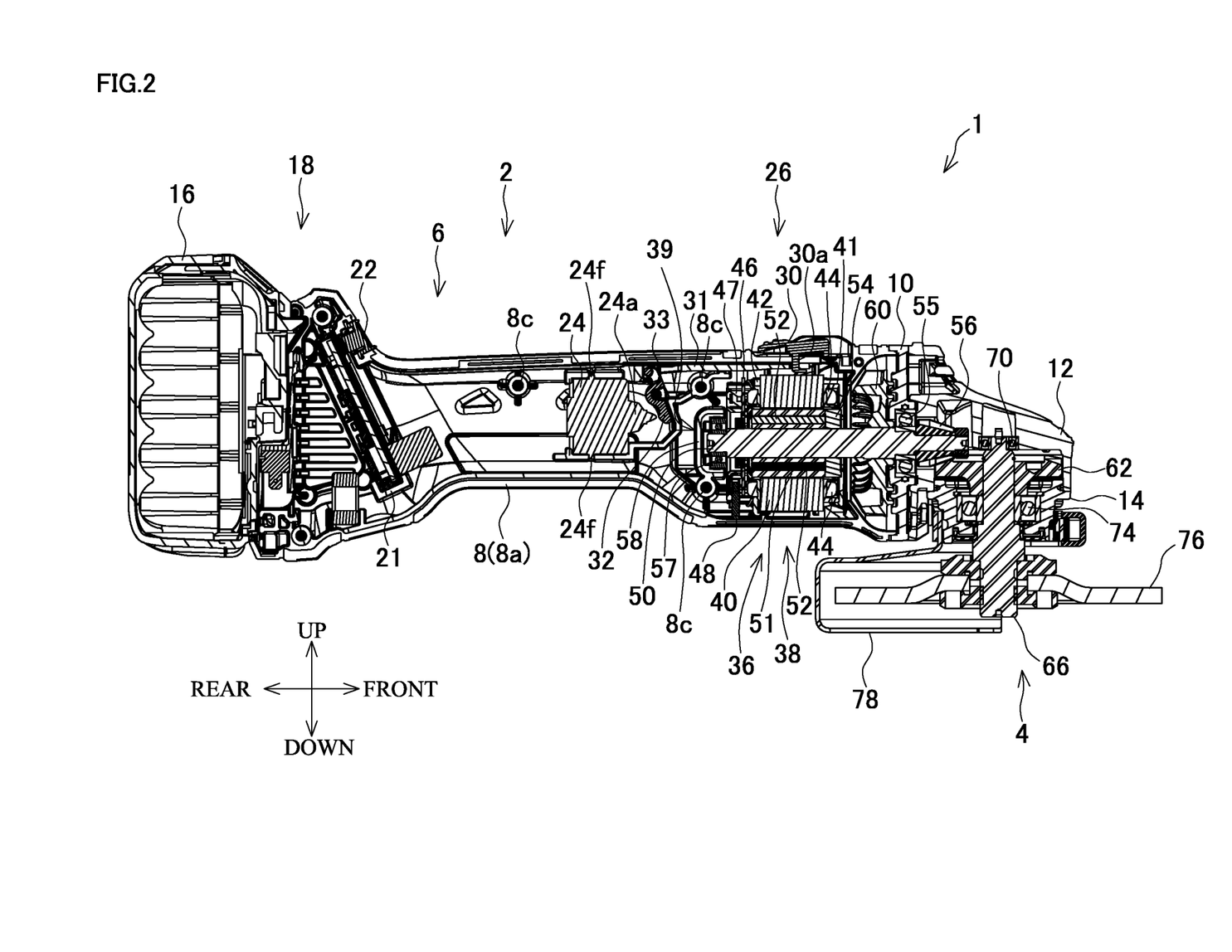
FIG. 2 is a longitudinal center cross-sectional view of FIG. 1.
Figure 3:
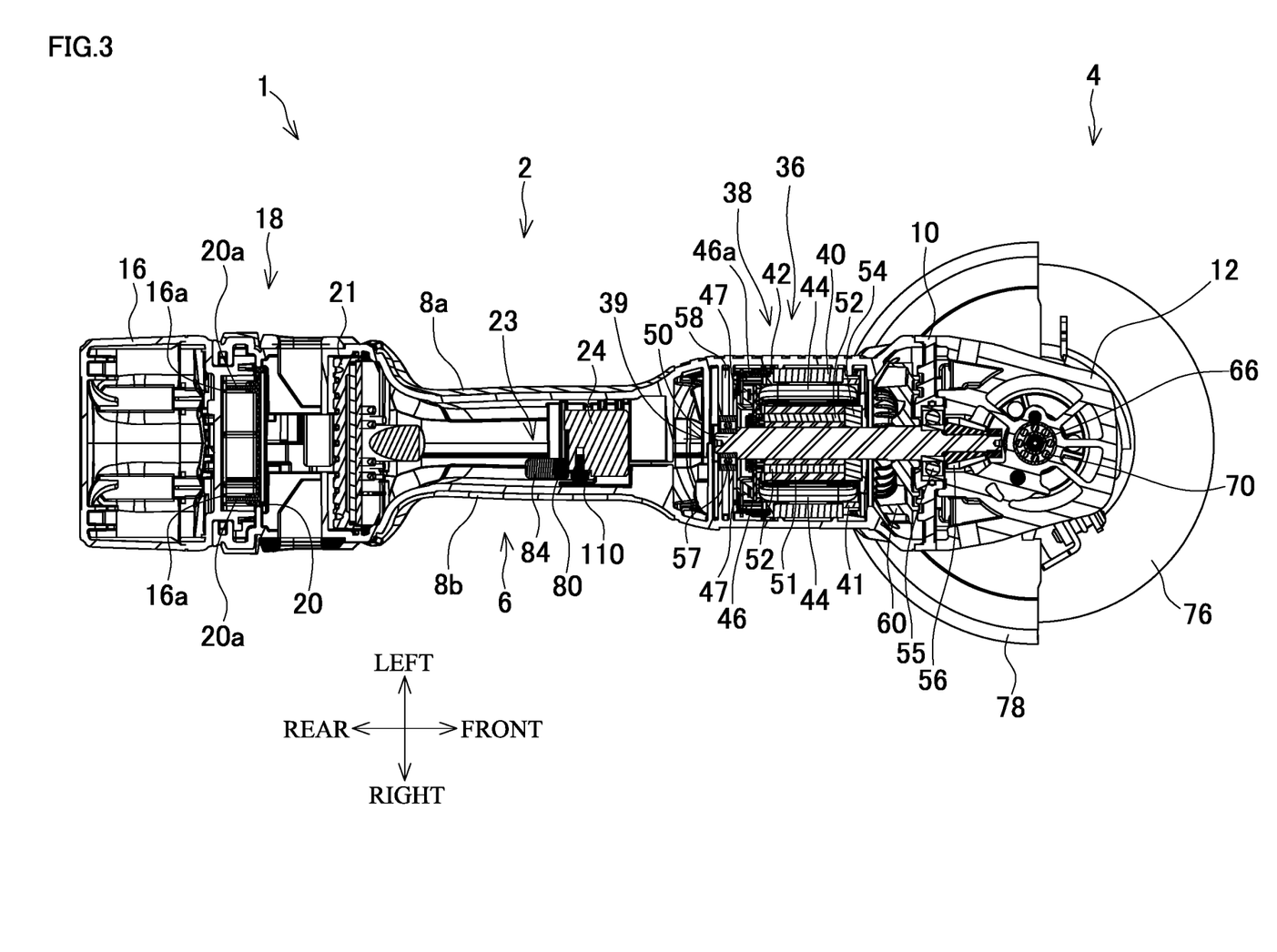
FIG. 3 is a lateral center cross-sectional view of FIG. 1.

FIG. 1 is a perspective view of a grinder 1 as an exemplary electric power tool, FIG. 2 is a longitudinal center cross-sectional view of the grinder 1, and FIG. 3 is a lateral center cross-sectional view of the grinder 1. FIG. 2 and FIG. 3 omit a part of internal mechanisms such as wirings.

A right side in FIG. 2 indicates a front side of the grinder 1, and an upper side in FIG. 2 indicates an upper side of the grinder 1. A right side in FIG. 3 indicates the front side of the grinder 1, and an upper side in FIG. 3 indicates the left side of the grinder 1. However, the directions may be changed as necessary corresponding to a workpiece, an operation condition, a move of a member, or similar condition.

The grinder 1 includes a main body portion 2 along a front-rear direction, and an output unit 4 disposed on a front side of the main body portion 2.

An outer-wall from the main body portion 2 to the output unit 4 is a housing 6.

The housing 6 includes a main body housing 8 as an outer-wall of the main body portion 2, a disc-shaped bearing retainer 10 arranged in front of the main body housing 8, a gear housing 12 arranged in front of the bearing retainer 10, and a bearing retainer 14 arranged under the gear housing 12. The gear housing 12 and the bearing retainer 14 form an outer-wall of the output unit 4.

The main body housing 8 is constituted of half portions, and formed by combining a main body housing left side portion 8a and a main body housing right side portion 8b by a plurality of screws 8c.

The bearing retainer 10 and the gear housing 12 are secured to a front portion of the main body housing 8 by a plurality of (four) common screws 12a.

Figure 4:
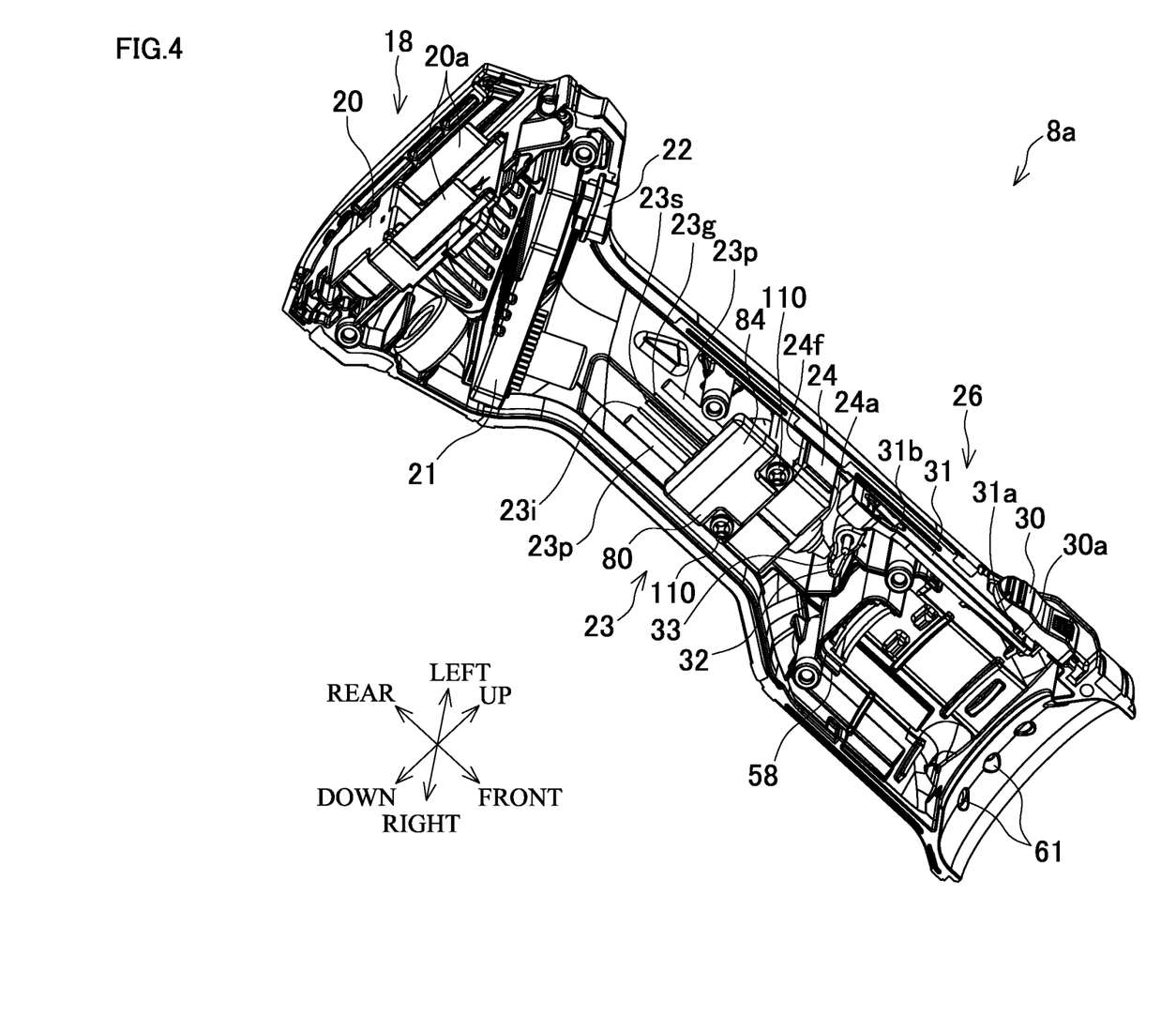
FIG. 4 is a perspective view of a main body housing left side portion and some members in FIG. 1.

FIG. 4 is a perspective view illustrating a state where some members are mounted to the main body housing left side portion 8a.

The main body housing 8 has a rear portion on which a battery mounting portion 18 for mounting a battery 16 is formed.

The battery mounting portion 18 is formed by mounting a terminal block 20 to a portion of the main body housing 8 expanded in an upper and lower direction and a leftward and rightward direction compared with the other portions. The terminal block 20 includes a pair of terminal rails 20a extending in an upper and lower direction.

The battery 16 has a block shape, internally includes a plurality of battery cells (not illustrated), and has an output voltage of 14.4 V (Volt) here. The battery 16 includes a pair of terminal grooves 16a (FIG. 3) to receive the respective terminal rails 20a on the terminal block 20 of the battery mounting portion 18.

A controller 21 is disposed ahead of the terminal block 20. The controller 21 is downwardly disposed so as to be far from the terminal block 20 toward the lower side. The controller 21 is electrically coupled to each terminal rail 20a by wirings (not illustrated). The controller 21 includes a display unit 22 that displays an operating state of the grinder 1. The display unit 22 is exposed on an outer surface of the main body housing 8 (the battery mounting portion 18).

A terminal unit 23 and a switch box 24 are internally disposed to a center portion of the main body housing 8 ahead of the controller 21. The switch box 24 is a target component to which the terminal unit 23 is mounted.

The terminal unit 23 is electrically coupled to the controller 21 by a pair of power lines 23p and a plurality of (three) signal lines 23g, 23s, and 23i. FIG. 4 illustrates a part of these lead wires. The plurality of lines are also collectively referred to as "line".

The switch box 24 includes a button 24a configured to be pressed, and is installed so as to have the button 24a in a frond side. The button 24a projects forward with respect to other portions of the switch box 24. When the button 24a is slightly pressed (pressing to a start-to-be-pressed position of the button 24a), the switch box 24 transmits a pressing-start signal, and when the button 24a is pressed to a predetermined position or more over the start-to-be-pressed position, the switch box 24 transmits an ON-signal.

The terminal unit 23 is installed to a right side of the switch box 24.

The button 24a of the switch box 24 is operated by a slide arm mechanism 26.

The slide arm mechanism 26 includes a slider 30, an arm 31, and a seesaw piece 32.

The slider 30 is disposed to be slidable in a front-rear direction at a front end portion on the outer surface of the main body housing 8. The slider 30 has a lower portion as a projecting piece 30a that projects downward and enters the main body housing 8.

The arm 31 is disposed to an upper portion inside the main body housing 8 extending in the front-rear direction. The arm 31 has a front end portion on which a front hole 31a is formed, and the projecting piece 30a of the slider 30 is configured to enter the front hole 31a. The arm 31 is disposed to be slidable in the front-rear direction.

The seesaw piece 32 is a plate-shaped member that has a lateral hole at the center, and disposed to be swingable around a shaft 33 in a state where the shaft 33, which is disposed inside the main body housing 8 in a right-left direction, enters the lateral hole and the seesaw piece 32 extends in an upper and lower direction. The seesaw piece 32 has an upper portion configured to enter a rear hole 31b formed at a rear end portion of the arm 31, and a lower portion disposed in front of the button 24a of the switch box 24.

When the slider 30 is pressed forward, the arm 31 moves forward via the projecting piece 30a and the front hole 31a, and the upper portion of the seesaw piece 32 moves forward with the arm 31 via the rear hole 31b. Thus, the seesaw piece 32 is swung around the shaft 33 to cause the lower portion of the seesaw piece 32 to press the button 24a. The amount of the pressing of the button 24a varies corresponding to the amount of the sliding forward of the slider 30.

An electric motor 36 is secured inside the main body housing 8. The motor 36 is a DC-driven brushless motor. The main body housing 8 mounts the motor 36 to serve as a motor housing.

The motor 36 includes a cylindrically-shaped stator 38 secured to the main body housing 8, and a rotor 39 (an inner rotor) arranged inside the stator 38.

The stator 38 includes a cylindrically-shaped stator core 40, a front insulating member 41 and a rear insulating member 42, and a plurality of (six) drive coils 44. The stator core 40 has an axial direction in the front-rear direction, and includes a plurality of (six) internal teeth that inwardly project. The front insulating member 41 and the rear insulating member 42 are disposed in front and rear of the stator core 40. The drive coils 44 are wound around the respective internal teeth of the stator core 40 via the front insulating member 41 and the rear insulating member 42. A sensor substrate 46 is secured to the rear insulating member 42 by a plurality of screws 46a. A plurality of (three) magnetic sensors (not illustrated) are secured to a front surface of the sensor substrate 46. Furthermore, total six coil coupling portions 47 are disposed as couplings that electrically couple each drive coil 44 to the sensor substrate 46 on a peripheral edge of a rear surface of the rear insulating member 42. The coil coupling portion 47 is electrically coupled to a downwardly projecting terminal portion 48, and one end of a lead wire (not illustrated) is coupled to the terminal portion 48 and the other end of the lead wire is coupled to the controller 21.

The rotor 39 includes a motor shaft 50 as a rotation shaft (a rotor shaft), a cylindrically-shaped rotor core 51 disposed on a peripheral area of the motor shaft 50, a plurality of plate-shaped permanent magnets 52, and a plurality of sensor permanent-magnets (not illustrated). The permanent magnets 52 are embedded in the rotor core 51 in a state where polarities alternately change in a circumferential direction. The sensor permanent-magnets are radially disposed on a rear side of the permanent magnets 52 (the sensor substrate 46 side of the stator 38). The rotor core 51, each of the permanent magnets 52, and the sensor permanent-magnets constitute a rotor assembly. The permanent magnets 52 may be pipe-shaped permanent magnets disposed outside the rotor core 51 and having polarities alternately changing in the circumferential direction.

A pipe-shaped resin sleeve 54 is disposed on the front side of the rotor core 51 of the motor shaft 50. A motor front bearing 55 is disposed ahead of the sleeve 54 and arranged on a peripheral area of the front portion of the motor shaft 50. The motor front bearing 55 is mounted to the bearing retainer 10. A pinion 56 is secured to the front side of the motor front bearing 55 and a distal end portion of the motor shaft 50 integrally with the motor shaft 50. On the other hand, a rear end portion of the motor shaft 50 is rotatably supported by a motor rear bearing 57. The motor rear bearing 57 is held by a rib 58 disposed to inwardly protrude inside the main body housing 8 so as to have a U-shaped cross section opening forward.

A fan 60 is disposed on a periphery of the front portion of the motor shaft 50 and between the sleeve 54 and the bearing retainer 10. The fan 60 is a centrifugal fan that has a plurality of vanes and integrally secured to the motor shaft 50.

A plurality of exhaust outlets 61 formed on the main body housing left side portion 8a are disposed outward the fan 60 (FIG. 4).

The pinion 56 of the motor shaft 50 is engaged with a bevel gear 62 disposed inside the gear housing 12. The bevel gear 62 is secured to a spindle 66.

The spindle 66 is disposed facing the upper and lower direction so as to have an angle of approximately 90° with the motor shaft 50. That is, the spindle 66 (an output shaft of the output unit 4) has an angle of approximately 90° with respect to the motor shaft 50, thus causing the grinder 1 to be an angle tool (an angle power tool).

The spindle 66 has an upper portion disposed inside the gear housing 12, a center portion disposed inside the bearing retainer 14, and a lower portion exposed from the bearing retainer 14.

The spindle 66 has an upper end portion entered into a spindle upper bearing 70 secured to the gear housing 12. The center portion of the spindle 66 is entered into a spindle lower bearing 74 secured to the bearing retainer 14.

The spindle 66 has a lower end portion to which a disc-shaped grinding wheel 76 (a tool bit) is mounted. The bearing retainer 14 has a lower portion to which a wheel cover 78 configured to be disposed on a periphery (rear half) of the grinding wheel 76 is mounted.

The following describes the terminal unit 23 in more detail based on mainly FIG. 5A to FIG. 9. In FIG. 2, FIG. 3, and FIGS. 7A to 7D, the internal mechanism of the switch box 24 is not illustrated.

The terminal unit 23 mounted to the right side of the switch box 24 includes a terminal base 80 made of resin (an insulator, for example, polyamide), upper and lower power supply terminals 82p and center signal terminals 82g, 82s, and 82i made of metal (conductor), and a cover 84. The power supply terminals 82p and signal terminals 82g, 82s, and 82i are assembled to the terminal base 80. The cover 84 covers a part of the terminal base 80. The plurality of terminals are also collectively referred to as "terminal".

Figure 5A:
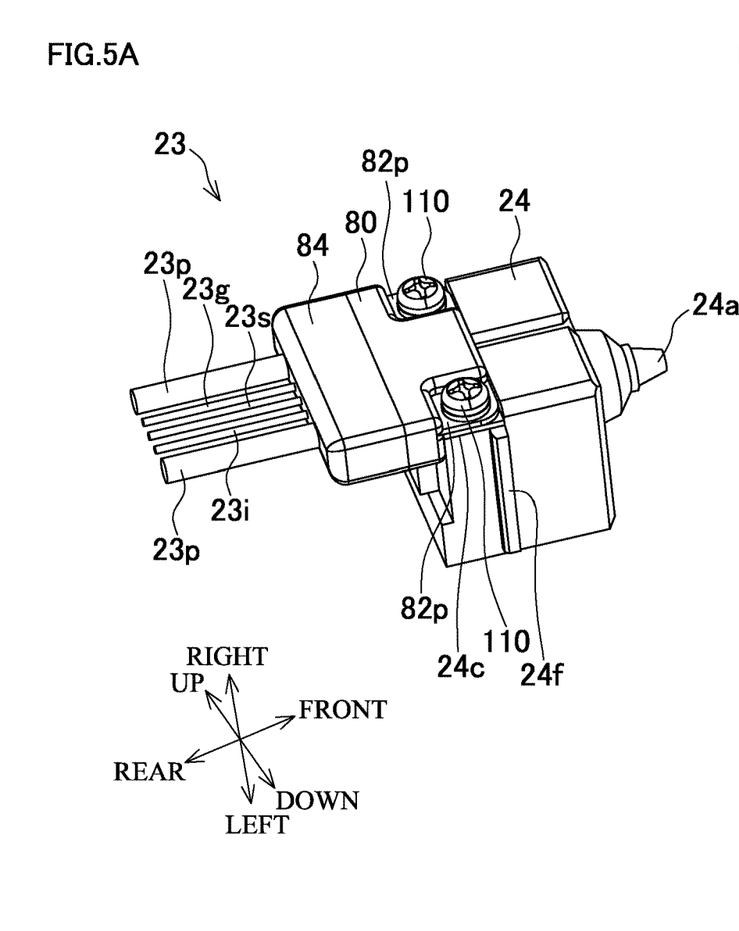
FIG. 5A is a perspective view and FIG. 5B is an exploded perspective view illustrating a terminal unit and a right surface, a lower surface, and a rear surface of a switch in FIG. 1.
Figure 5B:
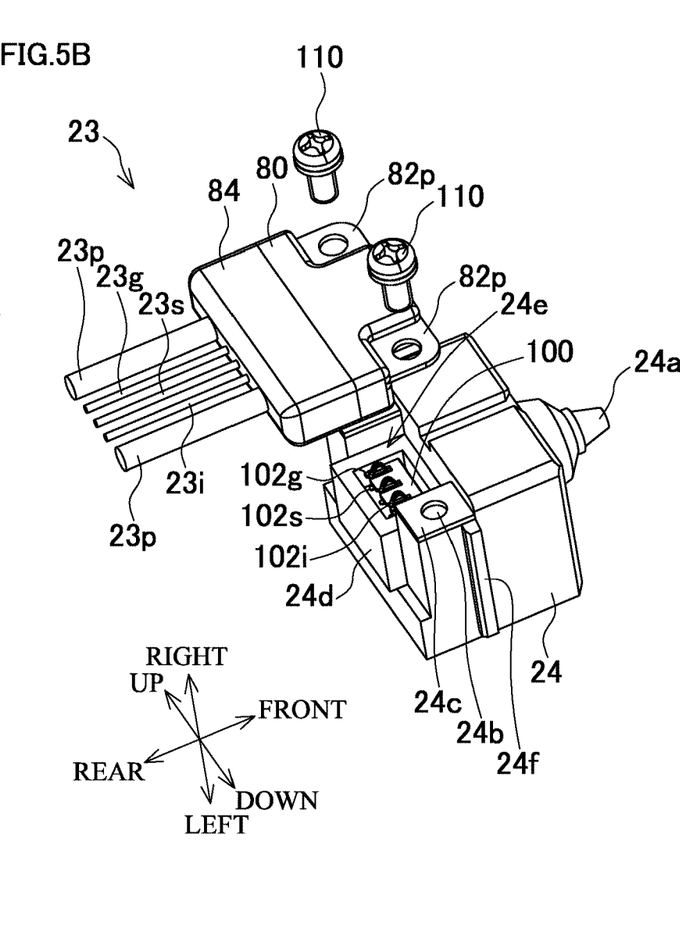
Figure 6A:
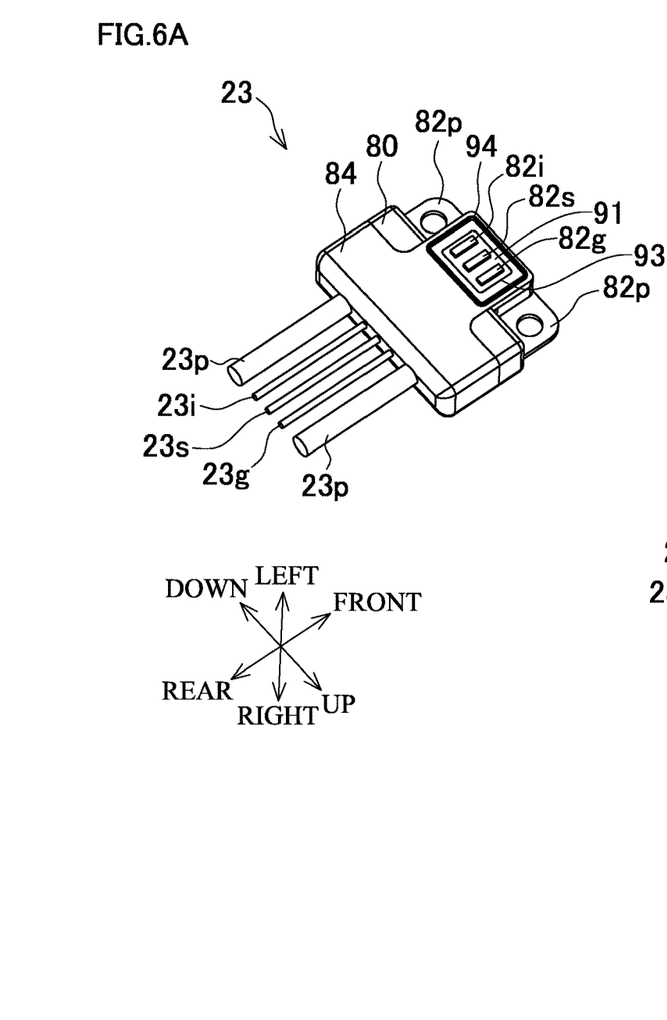
FIG. 6A is a perspective view and FIG. 6B is an exploded perspective view illustrating a left surface, a top surface, and the rear surface of the terminal unit in FIGS. 5A and 5B.
Figure 6B:
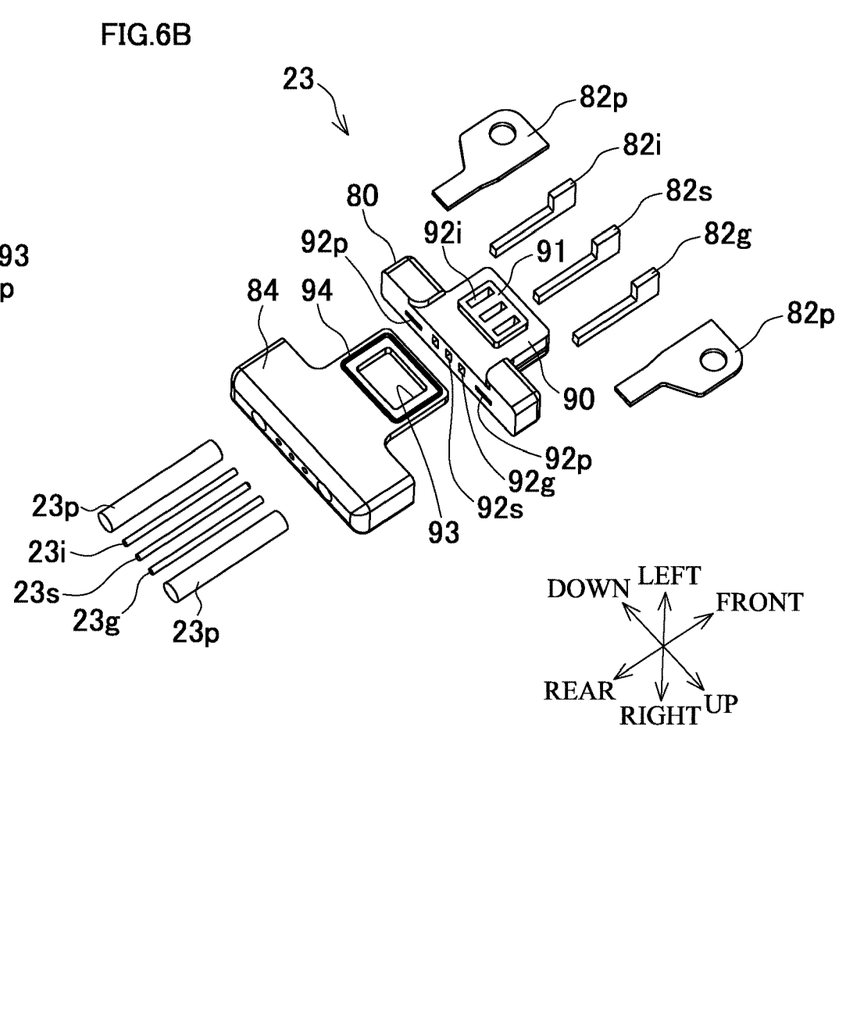

The terminal base 80 has a thin rectangular parallelepiped shape where a front upper corner and a front lower corner are notched (a T shape from the side view). The terminal base 80 has a rectangular-ring-shaped depression portion 90 at the center of a left surface, and the depression portion 90 is depressed to the right side compared with the other part of the left surface. A part surrounded by the depression portion 90 on the left surface of the terminal base 80 is a protrusion 91 projecting to the left side from the depression portion 90. The terminal base 80 has signal terminal holes 92g, 92s, and 92i, which have L shapes from the top view, formed from the protrusion 91 to a rear surface. Furthermore, the terminal base 80 has power supply terminal holes 92p each formed from a front surface to a rear surface on an upper portion or a lower portion (rear sides of the upper and lower notched portions).

The signal terminal 82g is a plate in an L shape from the top view, and is inserted into the signal terminal hole 92g. In more detail, the signal terminal 82g is assembled to the terminal base 80 while forming the signal terminal hole 92g by an insert molding. The signal terminal 82g has a front left surface disposed slightly left with respect to the left surface of the terminal base 80 other than the depression portion 90.

The signal terminal 82g has a rear end portion exposed from a rear end of the signal terminal hole 92g and electrically coupled to the signal line 23g. On the other hand, the signal terminals 82s and 82i are similarly combined with the terminal base 80 and the signal lines 23s and 23i. These combinations ensure the terminal base 80 to hold the signal terminals 82g, 82s, and 82i.

The power supply terminals 82p are each a spatulate plate, and each have a handle portion inserted into the power supply terminal hole 92p, thus passing through the power supply terminal hole 92p. The terminal base 80 thus receives each of the power supply terminals 82p to hold each of the power supply terminals 82p. The power supply terminals 82p each have a broad portion located on an upper front side or a lower front side of the terminal base 80, and each have a screw-hole in the center. The power supply terminals 82p each have a rear end portion exposed from the power supply terminal hole 92p and electrically coupled to the power line 23p.

The cover 84 is made of resin (an insulator, for example, flexible polyamide compared with the terminal base 80), and has elasticity. The cover 84 covers the rear surface of the terminal base 80, front end portions of the signal lines 23g, 23s, and 23i and the respective power lines 23p, rear end portions of the signal terminals 82g, 82s, and 82i and the respective power supply terminals 82p, and the depression portion 90 of the terminal base 80. The cover 84 has a right surface aligned so as to be continuous with a right surface of the terminal base 80. The cover 84 has a left surface where a hole portion 93, which has a space identical to the protrusion 91 of the terminal base 80 in size, is formed on a front portion, and the protrusion 91 is inserted into the hole portion 93. The left surface of the cover 84 is aligned with the left surface of the terminal base 80 other than the depression portion 90 (a left surface of the protrusion 91 and left surfaces on the rear sides of the leftward and rightward notched portions). A rectangular-ring-shaped ring portion 94 is formed on a peripheral area of a part where front left end portions of the signal terminals 82g, 82s, and 82i are exposed on the left surface of the cover 84, and the ring portion 94 projects leftward with respect to the other part. An amount of projection of the ring portion 94 to the left side is similar to amounts of projection of the front left end portions of the signal terminals 82g, 82s, and 82i from the left surface of the terminal base 80. In more detail, the amount of projection of the ring portion 94 is slightly small compared with the amounts of projection of the front left end portions of the signal terminals 82g, 82s, and 82i, and the left end portions of the signal terminals 82g, 82s, and 82i are positioned to the left side with respect to the left end of the ring portion 94.

The cover 84 is integrally molded by applying hotmelt in a state where the terminal base 80, the signal terminals 82g, 82s, and 82i, the signal lines 23g, 23s, and 23i, the respective power supply terminals 82p, and the respective power lines 23p are combined. This integral molding of the terminal base 80 and the cover 84 is performed in a state where the cover 84 is fitted to the depression portion 90.

The cover 84 that covers a plurality of surfaces (the rear surface and the left surface) of the terminal base 80 is disposed to the terminal base 80 with a high strength compared with a case of covering only one surface.

Figure 7A:
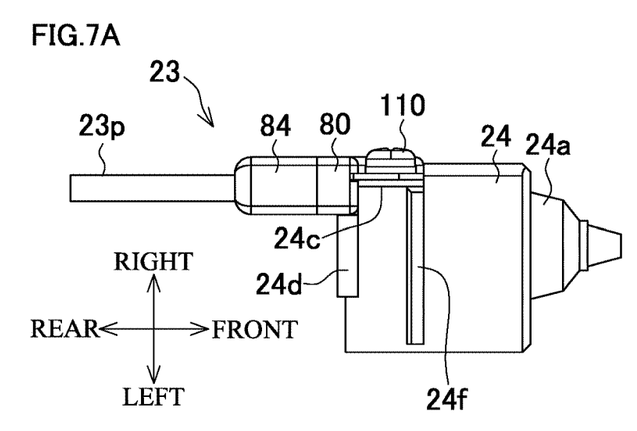
Figure 7B:
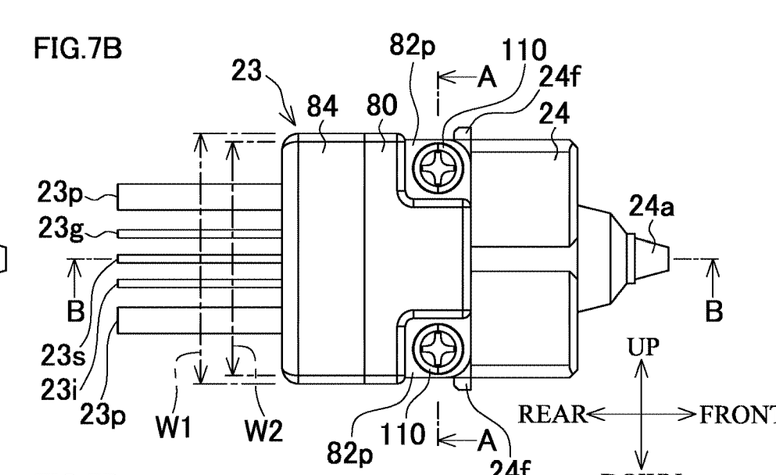
Figure 7C:
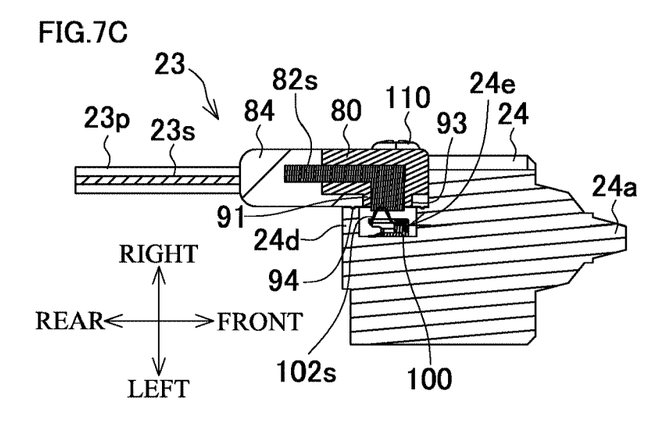
Figure 7D:
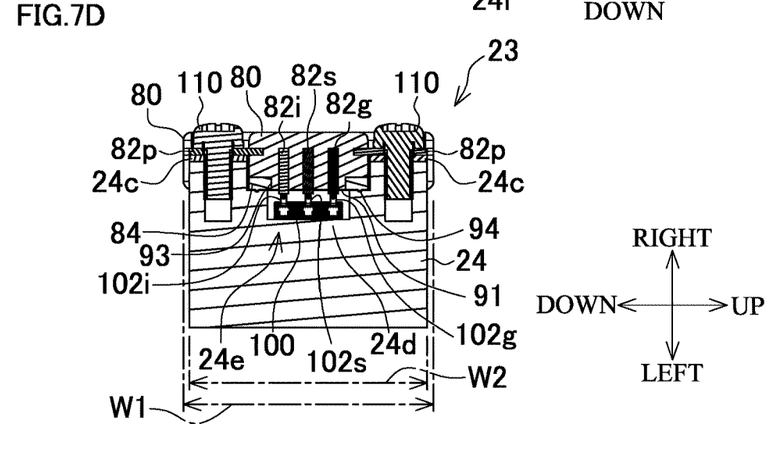
FIG. 7D is a cross-sectional view taken along the line A-A in FIG. 7B of the terminal unit and the switch in FIGS. 5A and 5B.
Figure 8A:
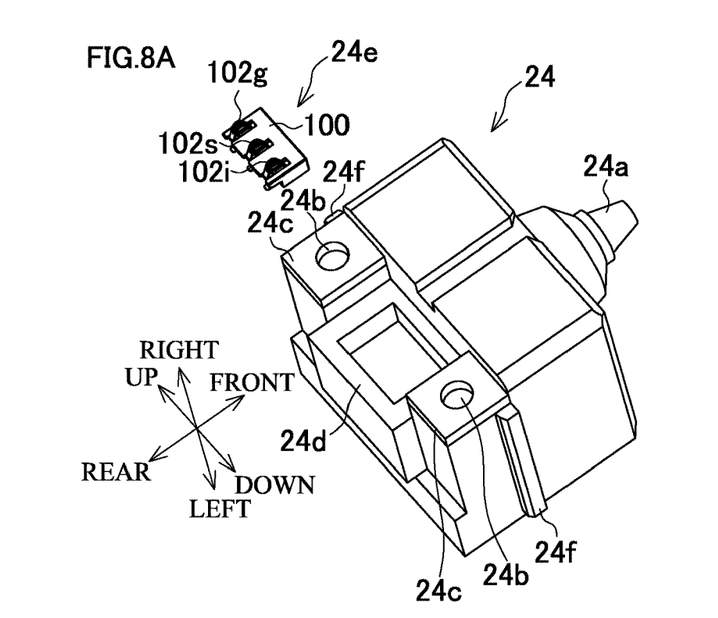
FIG. 8A is a perspective view of the switch in FIGS. 5A and 5B where a switch-side signal terminal portion is separated.
Figure 8B:
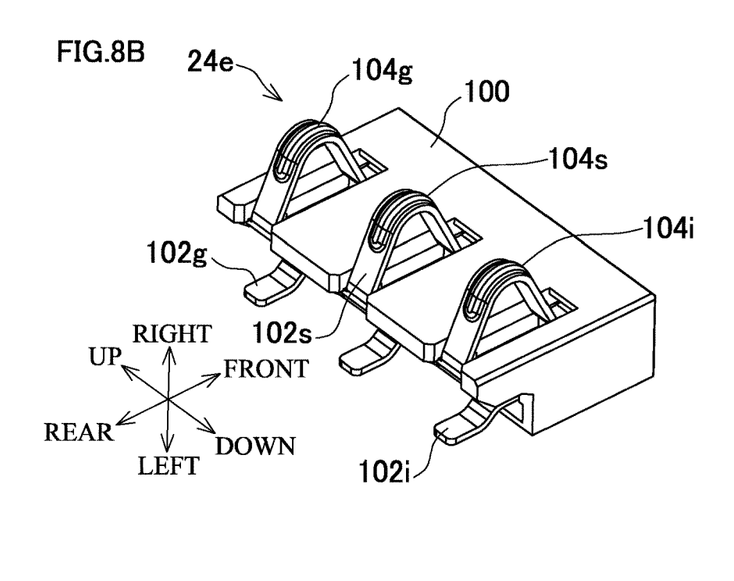
FIG. 8B is a perspective view of the switch-side signal terminal portion.
Figure 8C:
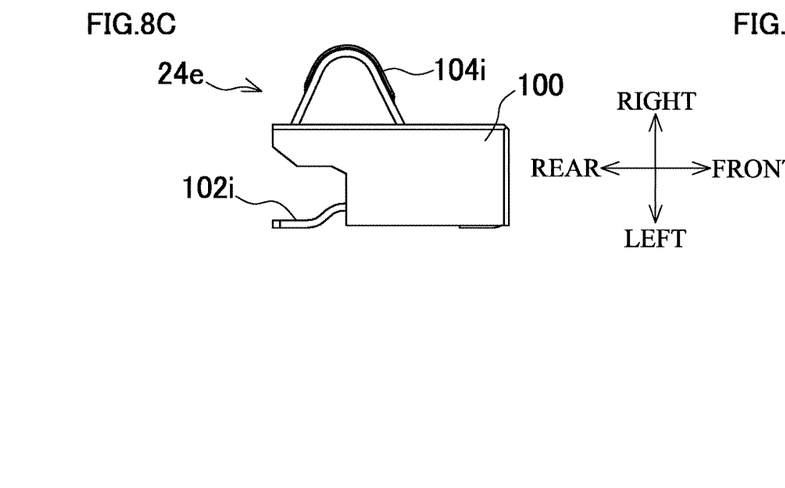
FIG. 8C is a bottom view of the switch-side signal terminal portion.
Figure 8D:
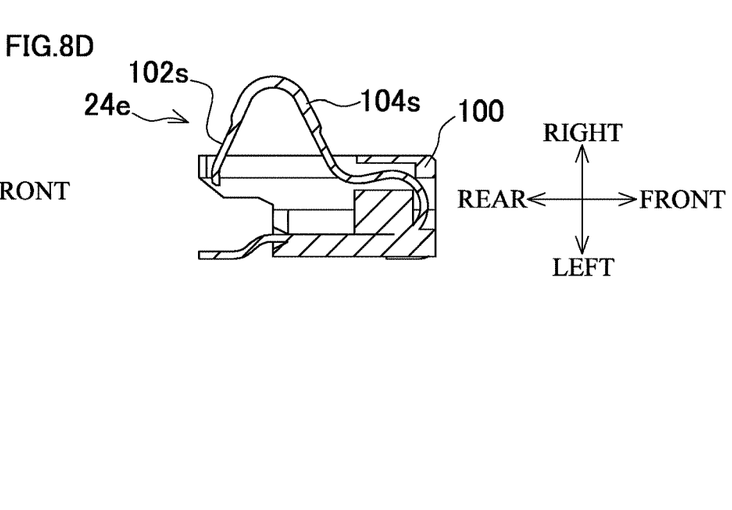
FIG. 8D is a center longitudinal cross-sectional view of the switch-side signal terminal portion.

Especially, as illustrated in FIGS. 7B and 7D, the maximum upper and lower width of the cover 84 or the maximum upper and lower width of the terminal base 80 as the maximum width W1 of the terminal unit 23 is greater than an upper and lower width W2 of the rear portion of the switch box 24.

Ribs 24f are each disposed to stand projecting upward or downward and extending in the right-left direction on the upper side or the lower side at the center of the switch box 24. The terminal unit 23 is mounted to the switch box 24 on the rear side with respect to the ribs 24f, and the upper and lower width W2 of the switch box 24 in the rear part with respect to the ribs 24f is smaller than the maximum width W1 of the terminal unit 23.

On the other hand, the switch box 24 has screw holes 24b on upper and lower sides in the rear portion, and the switch box 24 includes switch-side power supply terminals 24c as metal plates disposed on peripheral areas of the respective screw holes 24b. A distance between the screw holes 24b is similar to a distance between the screw-holes of the power supply terminals 82p of the terminal unit 23. The switch-side power supply terminals 24c are each electrically coupled to a power supply wiring part (not illustrated) inside the switch box 24.

The switch box 24 includes a bathtub-shaped portion 24d opened to the right side at the center of the rear portion, and a switch-side signal terminal portion 24e is installed in the bathtub-shaped portion 24d. The bathtub-shaped portion 24d is formed on a case (an outer surface portion) of the switch box 24.

The switch-side signal terminal portion 24e includes a box-shaped switch-side terminal base 100 and switch-side signal terminals 102g, 102s, and 102i. The switch-side terminal base 100 is made of resin (an insulator) and has three slits in the front-rear direction. The switch-side signal terminals 102g, 102s, and 102i are made of metal (conductors) and have curved C shapes from the top view. The switch-side signal terminals 102g, 102s, and 102i are each disposed so as to have a center portion in the slit of the switch-side terminal base 100, and right side portions bent in mountain shapes each project rightward from a right surface of the switch-side terminal base 100. Right side apexes of the right side portions and adjacent parts of the apexes form respective bulge portions 104g, 104s, and 104i bulged further rightward with respect to the other parts. On the other hand, rectilinear left side portions of the switch-side signal terminals 102g, 102s, and 102i are each secured in a state of contacting a right surface of a bottom portion of the bathtub-shaped portion 24d, and each electrically coupled to a signal line wiring part (not illustrated) inside the switch box 24. The respective right side portions of the switch-side signal terminals 102g, 102s, and 102i bent in the mountain shapes are supported by the rectilinear left side portions via curved middle portions, and given elasticity acting in mainly the right-left direction by the middle portions and similar portion.

Then, the terminal unit 23 is mounted to the switch box 24 by screwing screws 110 shared with the screw-holes and the screw holes 24b in a state where the respective screw-holes of the power supply terminal 82p are aligned with the corresponding screw holes 24b.

At this time, the respective power supply terminals 82p and the corresponding switch-side power supply terminals 24c mutually contact to be electrically coupled, thus being electrically conductive to one another.

The signal terminal 82g and the corresponding switch-side signal terminal 102g mutually contact to be electrically coupled, thus being electrically conductive to one another. In more detail, a front left end portion of the signal terminal 82g contacts the apex of the right side portion of the switch-side signal terminal 102g bent in the mountain shape or the adjacent part, namely the bulge portion 104g to be electrically coupled, thus being electrically conductive to one another. The same applies to the signal terminals 82s and 82i and the switch-side signal terminals 102s and 102i.

The ring portion 94 of the cover 84 of the terminal unit 23 contacts the right surface not the bottom portion (surrounding the bottom portion) of the bathtub-shaped portion 24d of the switch box 24, and brought into close contact in a state of being compressed by the elasticity. The ring portion 94 surrounds the switch-side signal terminal portion 24e inside the bathtub-shaped portion 24d. Therefore, the ring portion 94 (the seal portion) seals the signal terminals 82g, 82s, and 82i and the switch-side signal terminals 102g, 102s, and 102i, which are mutually electrically conductive. Such sealing by the ring portion 94 is performed by the installation of the terminal unit 23 to the switch box 24 simultaneously with the electrical conduction of the signal terminals 82g, 82s, and 82i with the switch-side signal terminals 102g, 102s, and 102i, and the electrical conduction of the respective power supply terminals 82p with the corresponding switch-side power supply terminals 24c.

Figure 9:
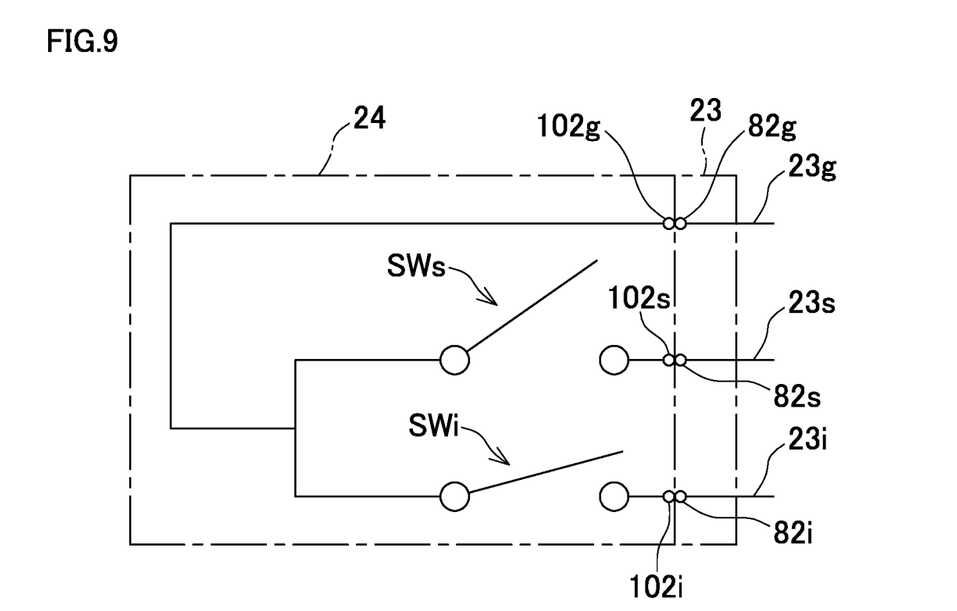
FIG. 9 is a circuit diagram according to signal lines of the terminal unit and the switch in FIGS. 5A and 5B.

Such couplings of the signal terminals 82g, 82s, and 82i to the switch-side signal terminal portion 24e form a circuit including the signal lines 23g, 23s, and 23i coupled to the controller 21, the terminal unit 23, and the switch box 24 as illustrated in FIG. 9.

That is, the switch box 24 has two switches SWs and SWi on the circuit.

The switch SWs is turned ON when the button 24a is pressed to the predetermined position or more over the start-to-be-pressed position, and switches the ON-signal of the switch box 24. The ON-signal is transmitted from the switch-side signal terminal 102s to the signal line 23s passing through the signal terminal 82s to reach the controller 21.

The switch SWi is turned ON when the button 24a is pressed to the start-to-be-pressed position or more, and switches the pressing-start signal of the switch box 24. The pressing-start signal is transmitted from the switch-side signal terminal 102i to the signal line 23i passing through the signal terminal 82i to reach the controller 21.

The switch-side signal terminal 102g, the signal terminal 82g, and the signal line 23g are grounded.

In the grinder 1, the controller 21 performs display on the display unit 22 by receiving the pressing-start signal transmitted based on the operation of the switch SWi, and activates the motor 36 by receiving the ON-signal transmitted based on the operation of the switch SWs. The controller 21 stops the motor 36 by not receiving the ON-signal (receiving an OFF-signal), and stops the display on the display unit 22 (after waiting for a certain period of time) by not receiving the pressing-start signal (receiving a pressing-start OFF-signal). A power source for operating the switch box 24 is supplied from the battery 16 through the power lines 23p, the power supply terminals 82p, and the switch-side power supply terminals 24c under the control by the controller 21.

Such a grinder 1 operates as follows, for example.

That is, an operator mounts the charged battery 16 to the battery mounting portion 18, and slides the slider 30 forward to cause the slide arm mechanism 26 to press the button 24a of the switch box 24. In the grinder 1, first, the controller 21 controls the display unit 22 to perform the display, and subsequently, the controller 21 controls the motor 36 to be driven by receiving the electric power supply from the battery 16.

The controller 21 has a switching element that performs switching of each drive coil corresponding to a rotation position of the rotor 39 obtained by the magnetic sensor of the sensor substrate 46, and the rotor 39 (the motor shaft 50) is rotated by this switching.

The rotation of the motor shaft 50 rotates the fan 60 to exhaust air from each of the exhaust outlets 61, and airflow from an air inlet (not illustrated, including openings and clearances other than the exhaust outlet 61 of the housing 6) to the exhaust outlet 61 is formed. The airflow cools the internal mechanism including the motor 36 of the grinder 1.

The rotation of the motor shaft 50 rotates the spindle 66 via the pinion 56 and the bevel gear 62. Since the number of teeth of the pinion 56 is smaller than the number of teeth of the bevel gear 62, the rotation of the spindle 66 is decelerated. The rotation of the spindle 66 rotates the grinding wheel 76 mounted to the spindle 66, thus performing grind by putting the grinding wheel 76 on a workpiece.

When the operator releases the sliding forward of the slider 30, the pressing of the button 24a of the switch box 24 by the slide arm mechanism 26 is gradually released. In the grinder 1, the electric power supply to the motor 36 is stopped to stop the motor 36, and the display on the display unit 22 is stopped.

Simply screwing the terminal unit 23 to the switch box 24 with the two screws 110 ensures the coupling of the signal lines 23g, 23s, and 23i and the respective power lines 23p between the controller 21 and the switch box 24 for the above-described operation.

When only one of the controller 21 and the switch box 24 has a trouble or maintenance, the controller 21 and the switch box 24 can be reconnectably separated by removing the two screws 110.

The respective power supply terminals 82p having the screw-holes ensure easily coupling the respective power lines 23p.

The screws 110 each have an axial force that presses the signal terminals 82g, 82s, and 82i to the bulge portions 104g, 104s, and 104i of the switch-side signal terminals 102g, 102s, and 102i, thus ensuring easily coupling the signal lines 23g, 23s, and 23i. In this pressing, the elasticity in the right-left direction of the mountain-shaped right side portions of the switch-side signal terminals 102g, 102s, and 102i causes biasing force to a side of the signal terminals 82g, 82s, and 82i. Then, these right side portions are pressed to the signal terminals 82g, 82s, and 82i as well. Accordingly, the signal terminals 82g, 82s, and 82i and the switch-side signal terminals 102g, 102s, and 102i are pressed one another due to the action of the axial force of the screws 110 and the action of the elastic force of the switch-side signal terminals 102g, 102s, and 102i, thus ensuring easily coupling these terminals and maintaining the couplings of these terminals.

The switch-side signal terminals 102g, 102s, and 102i and the signal terminals 82g, 82s, and 82i are surrounded by the ring portion 94 in close contact with the bathtub-shaped portion 24d on an outer wall of the switch box 24. Accordingly, the ring portion 94 serves for dust-proof and waterproof.

Furthermore, the terminal unit 23 has the maximum width W1 greater than the upper and lower width W2 at the rear portion of the switch box 24 as the mounting portion of the terminal unit 23. Accordingly, a worker who performs an installation work, such as a manufacturer and a maintenance person, can easily hold the terminal unit 23 positioned to the installation position without touching the switch box 24 by fingers even while hands of the worker or fingers (grip portion) of a tool come to the left side over the left surface. Then, the terminal unit 23 can be easily installed to the installation position and easily removed from the installation position.

The above-described grinder 1 includes the terminal unit 23 to which the signal lines 23*g*, 23*s*, and 23*i* and the power lines 23*p* are coupled, and the switch box 24 to which the terminal unit 23 is mounted. The signal lines 23*g*, 23*s*, and 23*i* transmit the pressing-start signal and the ON-signal. The power lines 23*p* supply electric power. The terminal unit 23 includes signal terminals 82*g*, 82*s*, and 82*i* coupled to the signal lines 23*g*, 23*s*, 23*i*, and power supply terminals 82*p* coupled to the power lines 23*p*. The switch box 24 includes the switch-side signal terminals 102*g*, 102*s*, and 102*i*, and the switch-side power supply terminals 24*c*. The switch-side signal terminals 102*g*, 102*s*, and 102*i* are electrically conductive to the signal terminals 82*g*, 82*s*, and 82*i* of the terminal unit 23 mounted to the switch box 24. The switch-side power supply terminals 24*c* are electrically conductive to the power supply terminals 82*p* of the terminal unit 23 mounted to the switch box 24.

Accordingly, simply removing the terminal unit 23 ensures separating the controller 21 and the switch box 24, which are coupled to the terminal unit 23, thus facilitating the replacement, the maintenance, and similar work for only one of the controller 21 and the switch box 24. The coupling of the respective power lines 23*p* to the switch box 24 and the coupling of the signal lines 23*g*, 23*s*, and 23*i* to the switch box 24 are performed at once by the installation of one terminal unit 23, thus achieving the coupling of the respective power lines 23*p* and the signal lines 23*g*, 23*s*, and 23*i* with less labor.

The terminal unit 23 includes the ring portion 94 that surrounds the signal terminals 82*g*, 82*s*, and 82*i*.

Accordingly, the ring portion 94 can serve for the dust-proof and the water-proof on the signal terminals 82*g*, 82*s*, and 82*i*, the switch-side signal terminals 102*g*, 102*s*, and 102*i*, or coupling portions of these terminals. Moreover, the installation of the terminal unit 23 to the switch box 24 easily ensures the dust-proof and the water-proof.

Furthermore, the signal terminals 82*g*, 82*s*, and 82*i* and the switch-side signal terminals 102*g*, 102*s*, and 102*i* are configured to mutually contact to be electrically conductive. The switch-side signal terminals 102*g*, 102*s*, and 102*i* in the mutually contacting terminals have the elasticity to be pressed to the contacted signal terminals 82*g*, 82*s*, and 82*i*.

Accordingly, the electrical coupling or the maintenance of the electrical coupling is achieved by a simpler configuration with more certainty.

In addition, the terminal unit 23 includes the terminal base 80 that holds the signal terminals 82*g*, 82*s*, 82*i* and the power supply terminals 82*p*. The cover 84 is disposed on the outer side of the terminal base 80, and the cover 84 is more flexible than the terminal base 80.

Accordingly, the flexible cover 84 is installed in a state where the terminal base 80 supports the signal terminals 82*g*, 82*s*, and 82*i* and the respective power supply terminals 82*p*. Then, when the cover 84 reaches the various terminals, the support of the terminals is reinforced. When the cover 84 reaches the coupling portions of the various terminals to the lead wires (the respective power lines 23*p* and the signal lines 23*g*, 23*s*, and 23*i*), the coupling portions are protected to be prevented from disconnections. When the cover 84 is disposed on the switch box 24 side including the ring portion 94, the switch box 24 is much protected by contacting the cover 84, or the performances of the dust-proof and the water-proof are improved.

The above-described grinder 1 includes the terminal unit 23 to which the signal lines 23*g*, 23*s*, and 23*i* and the power lines 23*p* are coupled, and the switch box 24 to which the terminal unit 23 is mounted. The signal lines 23*g*, 23*s*, and 23*i* transmit the pressing-start signal and the ON-signal. The power lines 23*p* supply electric power. The terminal unit 23 includes signal terminals 82*g*, 82*s*, and 82*i* coupled to the signal lines 23*g*, 23*s*, 23*i*, and power supply terminals 82*p* coupled to the power lines 23*p*. The switch box 24 includes the switch-side signal terminals 102*g*, 102*s*, and 102*i* and the switch-side power supply terminals 24*c*. The switch-side signal terminals 102*g*, 102*s*, and 102*i* are electrically conductive to the signal terminals 82*g*, 82*s*, and 82*i* of the terminal unit 23 mounted to the switch box 24. The switch-side power supply terminals 24*c* are electrically conductive to the power supply terminals 82*p* of the terminal unit 23 mounted to the switch box 24. The terminal unit 23 includes the seal portion (the ring portion 94) that seals the signal terminals 82*g*, 82*s*, and 82*i* and the switch-side signal terminals 102*g*, 102*s*, and 102*i*, which are mutually electrically conductive, by mounting the terminal unit 23 to the switch box 24.

Accordingly, the signal terminals 82*g*, 82*s*, and 82*i*, the switch-side signal terminals 102*g*, 102*s*, and 102*i*, and the coupling portions of these terminals can be sealed. Moreover, the sealing is performed without labor by installing the terminal unit 23 simultaneously with the coupling of the signal terminals 82*g*, 82*s*, and 82*i* to the switch-side signal terminals 102*g*, 102*s*, and 102*i*, and the coupling of the power supply terminals 82*p* to the switch-side power supply terminals 24*c*.

This disclosure is not limited to the above-described embodiment. For example, the above-described embodiment may be changed to the following modification examples as necessary.

Column-shaped guide pins (projecting bodies) may be disposed so as to project to the left side from the upper side and the lower side of the left surface of the terminal base of the terminal unit, and circular holes (guides) in the right-left direction may be disposed on the upper side and the lower side of the bathtub-shaped portion of the switch box such that the corresponding guide pins are inserted into the circular holes.

In this case, the terminal unit includes the projecting bodies and the switch box includes the guides for guiding the projecting bodies.

Accordingly, the terminal unit is guided to an appropriate installation position to the switch box. Then, the coupling between the terminals is ensured, a temporary placement (a temporary installation) before screwing for the installation can be surely performed, and the screw-holes of the terminal unit aligned with the screw holes of the switch box ensures easy and sure screwing (installation).

The projecting body is not limited to the column-shaped guide pin, and the guide is not limited to the circular hole. For example, a prismatic pin and a square hole guide may be employed, or a rib and a rail for receiving the rib may be employed. The projecting body may be disposed to the cover instead of or with the terminal base. Furthermore, a configuration where the projecting body is disposed to the switch box and the guide is disposed to the terminal unit may be employed. Alternatively, the projecting body and the guide may be mixed such that a projecting body and a guide are disposed to the terminal unit and a guide and a projecting body are disposed to the switch box to receive the projecting body and the guide of the terminal unit, respectively.

It is not necessary for the cover of the terminal unit to have the elasticity, or to be aligned with the left surface, the right surface, and similar surface of the terminal base. The cover of the terminal unit may run around the right surface, and may be formed by the insert molding, low-temperature low-pressure injection molding, and similar molding instead of the hotmelt. The signal terminal may be formed by a method other than the insert molding. The power supply terminal may be inserted into the terminal base by the insert molding, and the signal terminal may be inserted into the terminal base by insertion.

The signal terminal of the terminal unit is not required to have the plate shape in L shape, and may have the left end aligned with the left end the ring portion of the terminal unit. The power supply terminal portion of the switch box may be disposed to a place other than the peripheral area of the screw hole, and may have a shape other than the plate shape.

The positions, the types, and similar conditions of the terminals and the wirings in the terminal unit, the switch box, and similar unit may be appropriately changed as follows. For example, the signal terminal 82g and the signal line 23g may be disposed to a lower side or the center. The signal terminal may be configured to transmit a signal on the rotation position of the rotor of the brushless motor, detection signals of the various sensors, or various control signals. The number of the signal lines may be configured to be two or less or four or more. The number of the power lines may be configured to be one or three or more. The signal line may be disposed outside the power line.

The terminal unit may be mounted to the upper side and the like of the switch box instead of the right side.

The elasticity may be provided to only the signal terminal or both the signal terminal and the switch-side signal terminal such that one of the signal terminal and the switch-side signal terminal is pressed to the other (press to one another). Alternatively, the elasticity may be provided to at least one of the power supply terminal and the switch-side power supply terminal.

The power line may be electrically coupled to the power supply terminal by soldering, by spot welding, or by a connector. The same applies to the electrical coupling of the signal line to the signal terminal. A plurality of aspects may be mixed in these couplings.

The ring portion may surround only a part of the signal terminal, may surround only a part of or the whole of the power supply terminal, or may surround a part of or a whole of the signal terminal and the power supply terminal. That is, the seal portion may seal only a part of the mutually electrically conductive signal terminal and switch-side signal terminal, may seal only a part of or the whole of the mutually electrically conductive signal terminal and switch-side signal terminal, or may seal a part of or the whole of the mutually electrically conductive power supply terminal and switch-side power supply terminal, and the mutually electrically conductive power supply terminal and switch-side power supply terminal. The relation between the projection amount of the ring portion to the left side and the projection amount of the signal terminal to the left side is only necessary in a state where the signal terminal contacts the corresponding switch-side signal terminal and is sealed by the ring portion. For example, the projection amount of the ring portion to the left side may be greater than the projection amount of the signal terminal to the left side. The ring portion may be disposed only to the switch box, or may be disposed to the terminal unit and the switch box.

The component configured to operate based on the transmitting of the pressing-start signal of the switch box may be a light or similar unit instead of or with the display unit. The transmitting of the pressing-start signal of the switch box may be omitted such that the display unit operates similarly to the motor.

A paddle switch may be used as a component for performing the ON/OFF operation of the motor (operation of the switch box) instead of the slide arm mechanism.

A brake mechanism may be disposed between the motor and the spindle or similar position to apply a brake to a rotating member when the motor is turned off.

The housing may be appropriately changed as follows. For example, a rear cover may be further disposed. The main body housing may be commonized with the bearing retainer. The gear housing may be commonized with the bearing retainer. The main body housing may be commonized with the gear housing.

The number, the shapes, the materials, the installation manners, the support manners, and similar conditions of the various mechanisms, members and portions may be appropriately changed. For example, only a screw passing through the terminal base may be employed, or a screw for fixing the power supply terminal and a screw for fixing the terminal base may be used together, as the screw for mounting the terminal unit to the switch box. Alternatively, the terminal unit may be mounted to the switch box such that the terminal unit has a lock portion including a claw and the switch box has a locked portion including a depressed portion to receive the claw. The housing, the switch box, and the terminal unit may include ribs or projecting bodies formed as separate bodies for fixing. The rib of the switch box or similar unit may be appropriately omitted. The switch box may be configured to change the velocity of the motor shaft corresponding to the pressing amount of the button (for example, to cause the motor shaft to rotate fast as the pressing amount increases). The various terminals may be formed in not plate shapes but block shapes. The battery may be configured to have a different voltage.

A terminal unit mounted to the controller may be disposed instead of or together with the terminal unit mounted to the switch box. When both the first terminal unit mounted to the switch box and the second terminal unit mounted to the controller are disposed, the part from the switch box to the controller is separatable into three portions of the switch box, the controller, and lead wires (group), namely a lead wire unit that has terminal units on both sides.

The power line and the signal line inserted into the terminal unit may be coupled to the member such as the terminal block of the battery mounting portion not limited to the controller.

The terminal unit may be mounted to a component such as the motor to which the signal lines for transmitting and receiving the control signal and the sensor signal and the power line for driving are coupled, not limited to the switch box.

The grinder may be a grinder that includes a cord for being coupled to commercial power supply and is driven by the commercial power supply (AC), not limited to the grinder that includes the battery mounting portion and is driven by the battery (DC).

Furthermore, this disclosure is applicable to not only the grinder but also other electric power tools including a sander or various components in the electric power tool.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An electric power tool, comprising:
   a removable terminal unit to which a signal line and a power line are coupled, the signal line transmitting signal, the power line supplying electric power, the terminal unit including a signal terminal coupled to the signal line and a power supply terminal coupled to the power line;
   a component to which the terminal unit is mounted, the component including a component-side signal terminal and a component-side power supply terminal, the component-side signal terminal being electrically conductive to the signal terminal of the mounted terminal unit, and the component-side power supply terminal being electrically conductive to the power supply terminal of the mounted terminal unit; and
   a housing;
   wherein the component and the terminal unit are entirely contained in the housing.

2. The electric power tool according to claim 1, wherein the terminal unit includes a ring portion that surrounds at least one of the signal terminal and the power supply terminal.

3. The electric power tool according to claim 1, wherein at least one of a combination of the signal terminal and the component-side signal terminal and a combination of the power supply terminal and the component-side power supply terminal is configured to become electrically conductive by mutual contact, and at least one of the mutually contacting terminal has an elasticity to be pressed to the contacted terminal.

4. The electric power tool according to claim 1, wherein:
   the terminal unit includes a terminal base that holds at least a part of the signal terminal and the power supply terminal, and
   a cover is disposed on an outer side of the terminal base, the cover is more flexible than the terminal base.

5. The electric power tool according to claim 1, wherein one of the terminal unit and the component includes a projecting body, and the other includes a guide that guides the projecting body.

6. The electric power tool according to claim 1, wherein the terminal unit is mounted to the component with a screw.

7. The electric power tool according to claim 1, wherein the component is at least any of a switch box, a motor, and a controller of the motor.

8. The electric power tool according to claim 1, wherein the terminal unit is attached to the component by screws, such that the terminal unit can be removed from the electric power tool by removing the screws.

9. The electric power tool according to claim 8, wherein the screws pass through and connect the power supply terminal to the component-side power supply terminal.

10. An electric power tool, comprising:
    a removable terminal unit to which a signal line and a power line are coupled, the signal line transmitting signal, the power line supplying electric power, the terminal unit including a signal terminal coupled to the signal line and a power supply terminal coupled to the power line;
    a component to which the terminal unit is mounted, the component including a component-side signal terminal and a component-side power supply terminal, the component-side signal terminal being electrically conductive to the signal terminal of the mounted terminal unit, and the component-side power supply terminal being electrically conductive to the power supply terminal of the mounted terminal unit;
    a seal portion included in at least one of the terminal unit and the component, the seal portion sealing at least one of a combination of the signal terminal and the component-side signal terminal and a combination of the power supply terminal and the component-side power supply terminal by mounting the terminal unit to the component, the signal terminal and the component-side signal terminal being mutually electrically conductive, and the power supply terminal and the component-side power supply terminal being mutually electrically conductive; and
    a housing;
    wherein the component and the terminal unit are entirely contained in the housing.

11. The electric power tool according to claim 10, wherein the terminal unit is mounted to the component with a screw.

12. The electric power tool according to claim 10, wherein the component is at least any of a switch box, a motor, and a controller of the motor.

* * * * *